Patented Sept. 2, 1952

2,609,384

UNITED STATES PATENT OFFICE 2,609,384

α-ARYL-β-ALKOXYACRYLONITRILES AND METHOD OF PREPARING SAME

Peter Byrom Russell, Tuckahoe, N. Y., and Norman Whittaker, London, England, assignors to Burroughs Wellcome & Co. (U. S. A.) Inc., Tuckahoe, N. Y., a corporation of New York No Drawing. Application December 30, 1950, Serial No. 203,792

6 Claims. (Cl. 260—465)

This invention relates to new α-aryl-β-alkoxy-acrylonitriles and to an improved process for their preparation.

These compositions are important intermediates for the preparation of chemotherapeutic agents, particularly those of the 5-aryl-4-aminopyrimidine series (as described by Hitchings, Russell and Falco in U. S. Application S. N. 74,462). Their importance derives from the fact that α-aryl-β-hydroxyacrylonitriles condense poorly, or, if substituted by alkyl or aryl groupings in the β position, may fail to condense with guanidine or amidines, whereas the corresponding β-alkoxy derivatives react to form the desired pyrimidines in good yield.

The new compounds of the present invention may be illustrated by the following general formula:

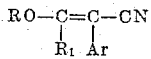

in which Ar is selected from the class consisting of phenyl and halophenyl and $R_1$ is selected from the class consisting of hydrogen, and lower alkyl radicals.

These compounds may be prepared by treating the α-aryl-β-hydroxyacrylonitrile (II) (which may also be named as an α-aryl-α-acylacetonitrile (I), the two forms being tautomeric) with an alkylating agent to give the β-alkoxy derivative III. Ordinary alkylating agents such as ethyl iodide and dimethylsulfate

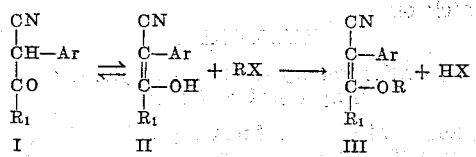

give some of the desired substance; however, superior yields are obtainable through the use of (1) a diazoalkane or (2) the new method described herein in which the alkylating agent is an orthoester. In view of the hazards and difficulties connected with the use of diazoalkanes, particularly on a manufacturing scale, the employment of an orthoester is the preferred method.

The method consists in heating together the β-hydroxy nitrile (II) to be alkylated with a suitable orthoester, and the removal by distillation of the ester and alcohol, which are by-products of the reaction, and of any excess and unreacted orthoester. The residual alkoxynitrile (III) may, for certain purposes, be used in the crude state and may crystallize spontaneously and may at times be isolated by distillation, preferably in vacuo.

The reaction of the β-hydroxynitrile with an orthoester may be illustrated as follows:

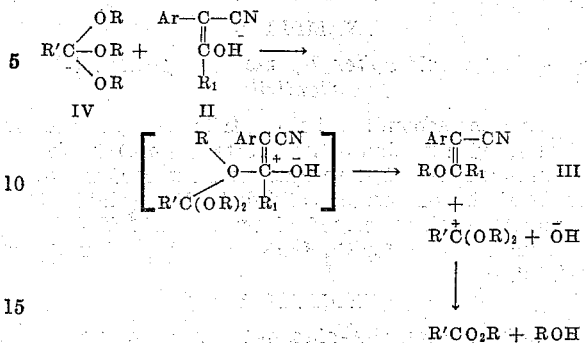

It is understood that the invention is in no way limited or bound by this explanation of the course of the reaction, which is advanced for illustrative purposes only.

Since the alkyl radical (R, III) does not participate in the further reaction of the alkoxynitrile all lower alkyl radicals are essentially equivalent. Furthermore, the orthoesters of various acids are equally reactive. Therefore a wide choice of ortho ester is available, and preference for a particular orthoester is determined by availability and cost.

The following examples are given to illustrate the manner in which the invention may be carried out, but it is to be understood that the scope of the invention is defined in the claims.

EXAMPLE 1

α-p-Chlorophenyl-β-ethoxyacrylonitrile

α-Formyl-p-chlorophenylacetonitrile (20 g.) was heated over a free flame with ethylorthoformate (40 ml.). The mixture of ethyl alcohol and ethyl formate evolved was collected. After about one hour 12.4 g. had been collected and the distilling temperature rose above 80°; the reaction was complete. The excess ethylorthoformate was then removed in vacuo, and the residue distilled. It gave a colorless oil (17.0 g.; B. P. 132°–133°/0.04 mm.) which solidified on cooling.

Calc'd. for $C_{11}H_{10}ONCl$: C, 63.6; H, 4.8; N, 6.8; Cl, 17.1. Found: C, 63.1; H, 5.0; N, 6.8; Cl, 16.6

EXAMPLE 2

α-2,4-dichlorophenyl-β-methoxyacrylonitrile

α-Formyl-2,4-dichlorophenylacetonitrile (10 g.) and methylorthoacetate (25 ml.) were heated together as in the previous example. When no more methanol and methylacetate were evolved, the excess methylorthoacetate was removed in vacuo and the residue crystallized. After recrystallization from ethanol it formed needles M. P. 105°–107°. (Undepressed on admixture with the product obtained by action of diazomethane on the same ketonitrile).

Calc'd. for $C_{10}H_6ONCl_2$: C, 52.9; H, 2.6; N, 6.2. Found: C, 53.0; H, 3.0; N, 6.4.

EXAMPLE 3

*α-p-Chlorophenyl-β-ethoxy-β-methylacrylonitrile*

α-Acetyl-p-chlorophenylacetonitrile and ethylorthoformate were reacted together as above. After removal of the excess orthoester the product crystallized. Recrystallized from ethanol, it formed prisms M. P. 110°. Boils at 128–130° at 0.04 mm.

Calc'd. for $C_{12}H_{12}ONCl$: C, 65.2; H, 5.4; N, 6.3. Found: C, 65.3; H, 5.3; N, 6.1.

EXAMPLE 4

*α-3',4'-dichlorophenyl-β-methoxy-β-methylacrylonitrile*

The corresponding keto nitrile (12 g.) was heated with methyl orthoacetate (24 ml.) in the usual manner. The residue after removal of excess of the orthoester solidified. Recrystallized from ethanol, it formed plates M. P. 71–74.

Anal.: Calc'd. for $C_{11}H_9ONCl_2$: N, 5.8. Found: N, 6.0.

EXAMPLE 5

*α-p-Chlorophenyl-β-ethoxy-β-methoxymethylacrylonitrile*

α-Methoxyacetyl-p-chlorophenylacetonitrile (10 g.) was heated with 20 ml. of ethyl orthoformate in the usual manner. After removal of the ester the residual solid solidified. It crystallized from ethanol in colorless needles, M. P. 53–55°.

Anal.: Calc'd. for $C_{13}H_{14}O_2NCl$: N, 5.6. Found: N, 5.7.

EXAMPLE 6

*α-(3,4-dichlorophenyl)-β-ethoxy-β-methylacrylonitrile*

α-Acetyl-3,4-dichlorophenylacetonitrile (5.5 g.) was treated with 110 ml. of ethylorthoformate. Removed of volatile material and of excess orthoester, gave a solid residue. Recrystallized from ethanol it formed needles M. P. 90°–93°.

Anal.: Calc'd. for $C_{12}H_{11}ONCl_2$: N, 5.5%. Found: N, 5.6%.

EXAMPLE 7

*α-m-Chlorophenyl-β-n-butoxyacrylonitrile*

α-Formyl-m-chlorophenylacetonitrile (9.0 g.) was refluxed with 20 ml. of n-butylorthoformate, the mixture of n-butyl formate and n-butylalcohol boiled at 110°. When the reaction was complete the excess orthoester was removed in vacuo. The α-m-chlorophenyl-β-n-butoxyacrylonitrile was a heavy oil. It was condensed with guanidine, giving 2,4-diamino-5-m-chlorophenylpyrimidine (5.5 g.) M. P. 208°, identical with a sample prepared by other methods.

EXAMPLE 8

*α-p-Chlorophenyl-β-ethoxy-β-ethylacrylonitrile*

α-Propionyl-p-chlorophenylacetonitrile 32 gms. refluxed with 64 cc. ethylorthoformate. When the low boiling material was evaporated the excess orthoformate was removed. The α-p-chlorophenyl-β-ethoxy-β-ethylacrylonitrile formed a heavy oil which on condensation with guanidine gave 2,4-diamino-5-p-chlorophenyl-6-ethylpyrimidine.

EXAMPLE 9

*α-Phenyl-β-ethoxy-β-ethylacrylonitrile*

α-Propionylphenylacetonitrile (40 gm.) heated with 80 gm. of ethyl orthoformate as above. The product was obtained after removal of the ethylformate and ethyl alcohol as a thick oil.

EXAMPLE 10

*α-p-Tolyl-β-methoxy-β-methylacrylonitrile*

α-Acetyltolylacetonitrile (15 gms.) heated with 30 ml. of methyl orthoacetate. The low boiling material was removed as it was formed and finally the orthoacetate was removed in vacuo. The product formed a thick oil.

EXAMPLE 11

*α-p-Chlorophenyl-β-methoxyacrylonitrile*

α-Formyl-p-chlorophenylacetonitrile (18 g.) was heated with methyl orthopropionate (35 mls.) over a free flame. The methyl propionate and methyl alcohol boiled about 70°. The residue was freed from the orthoester in vacuum and the product formed a thick oil which crystallized; M. P. ca. 130°.

EXAMPLE 12

*α-p-Chlorophenyl-β-ethoxy-β-n-heptylacrylonitrile*

Prepared from α-caprylyl-p-chlorophenylacetonitrile and ethylorthoformate as above. The product was a heavy uncrystallizable oil.

EXAMPLE 13

*α-Phenyl-β-n-amyloxy-β-methylacrylonitrile*

Prepared from α-acetylphenylacetonitrile and n-amylorthoformate in the usual manner. The product formed a heavy uncrystallizable oil.

EXAMPLE 14

*α-Phenyl-β-n-propoxy-β-propylacrylonitrile*

Prepared as the above from α-butyrylphenylacetonitrile and n-propylorthoformate. It was a thick oil.

EXAMPLE 15

*α-p-Chlorophenyl-β-ethoxyacrylonitrile— using ethyl orthoacetate*

Recrystallized α-formyl-p-chlorophenylacetonitrile (20 g.) and ethyl orthoacetate (50 ml.) were heated under a free flame, collecting the mixture (15 g.) of ethyl acetate and ethyl alcohol produced. After 1 hour, excess of reagent was removed by evaporation in vacuo and, by distillation, α-p-chlorophenyl-β-ethoxyacrylonitrile (17.9 g.), B. P. 132–133°/0.04 mm., was obtained.

When reacted with guanidine this gave 2:4-diamino-5-p-chlorophenylpyrimidine (15 g.), M. P. 194–195°, unchanged on mixing with the pyrimidine derived from the product of Example 1.

We claim:

1. The process which comprises reacting an α-aryl-α-acylacetonitrile (tautomeric with an α-aryl-β-hydroxyacrylonitrile) with an orthoester, said reaction being carried out by heating a mixture of the reactants at a temperature not exceeding the boiling point of the orthoester, and in a manner to effect the continuous removal of the volatile products of the reaction, and then removing the excess of orthoester by distillation, preferably under reduced pressure, with recovery of the α-aryl-β-alkoxyacrylonitrile.

2. A substance of the formula

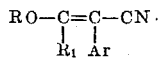

in which Ar is selected from the class consisting of phenyl and halophenyl radicals, R is a lower alkyl radical and R₁ is selected from the class consisting of hydrogen, and lower alkyl radicals.

3. α - p - Chlorophenyl - β - ethoxy - β - ethylacrylonitrile.

4. α - p - Chlorophenyl - β - ethoxy - β - methylacrylonitrile.

5. α - 3',4' - dichlorophenyl - β - ethoxy - β - methylacrylonitrile.

6. α - 3',4' - dichlorophenyl - β - methoxy - β - methylacrylonitrile.

PETER BYROM RUSSELL.
NORMAN WHITTAKER.

REFERENCES CITED

The following references are of record in the file of this patent:

Keller: Chemical Abst., vol. 31, col. 6215 (1937).